(12) United States Patent
Shibles

(10) Patent No.: US 6,253,711 B1
(45) Date of Patent: Jul. 3, 2001

(54) WINDOW MOUNTED PET PORTAL

(76) Inventor: Scott Shibles, 19 River Rd., Concord, NH (US) 03303

( * ) Notice: Subject to any disclaimer, the term of this patent is extended or adjusted under 35 U.S.C. 154(b) by 0 days.

(21) Appl. No.: 09/457,580

(22) Filed: Dec. 9, 1999

(51) Int. Cl.[7] .................................................. A01K 1/03
(52) U.S. Cl. .......................................................... 119/484
(58) Field of Search ................................... 119/416, 484, 119/485, 486, 622; D30/108

(56) References Cited

U.S. PATENT DOCUMENTS

| | | | |
|---|---|---|---|
| 2,932,279 | * | 4/1960 | Giles .................... 119/484 |
| 3,091,221 | * | 5/1963 | Worm .................... 119/484 |
| 3,499,246 | * | 3/1970 | Loukas .................. 119/484 |
| 4,291,645 | * | 9/1981 | Cruchelow et al. .......... 119/484 |
| 4,753,195 | | 6/1988 | Maggio ................. 119/52 R |
| 4,989,546 | | 2/1991 | Cannaday ................. 119/484 |
| 4,995,336 | * | 2/1991 | Deemer et al. ............. 119/484 |
| 5,133,291 | | 7/1992 | Justice ................. 119/51.01 |
| 5,167,202 | | 12/1992 | Bradford et al. ............ 119/484 |
| 5,195,457 | | 3/1993 | Namanny ................. 119/484 |
| 5,337,697 | | 8/1994 | Trimarchi et al. ........... 119/484 |
| 5,469,807 | | 11/1995 | Kosmaczeska .............. 119/484 |
| 5,649,500 | * | 7/1997 | Klavemann et al. .......... 119/484 |
| 5,678,509 | | 10/1997 | Dillon ................... 119/496 |
| 5,842,438 | | 12/1998 | Messmer ................. 119/165 |
| 5,890,455 | | 4/1999 | Donchey ................. 119/497 |

* cited by examiner

Primary Examiner—Charles T. Jordan
Assistant Examiner—Elizabeth Shaw
(74) Attorney, Agent, or Firm—Hayes, Soloway, Hennessey, Grossman & Hage, PC

(57) ABSTRACT

A window mounted system that will permit a cat to independently exit and enter a dwelling, apartment, mobile home, recreational vehicle or the like, includes internal partitions or curtains for minimizing heat loss and preventing odors from entering the dwelling.

7 Claims, 2 Drawing Sheets

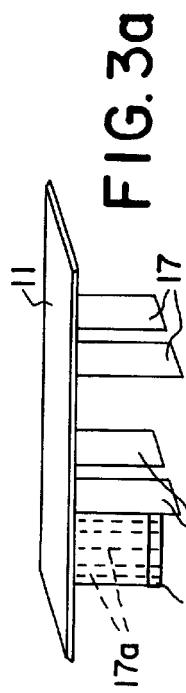
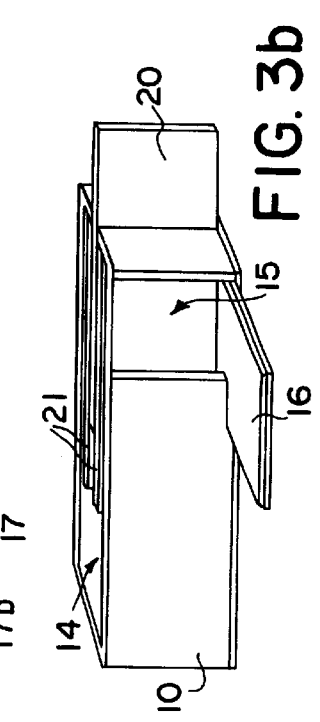
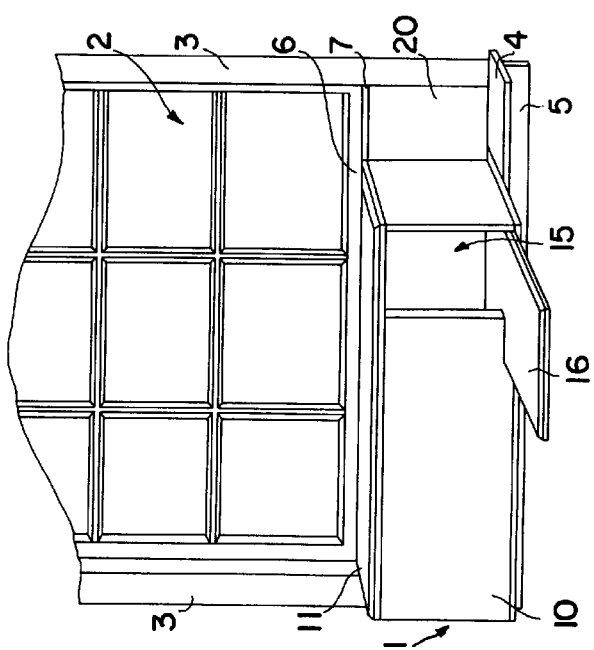
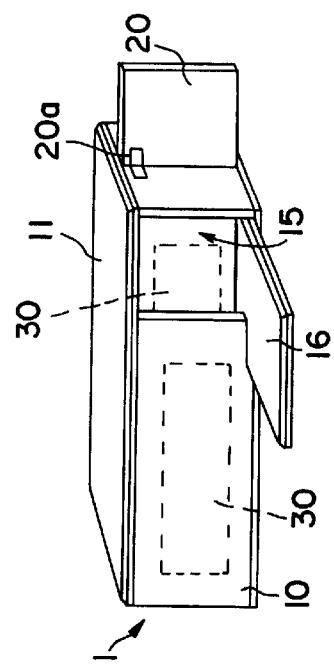

WINDOW MOUNTED PET PORTAL

BACKGROUND OF THE INVENTION

1. Field of the Invention

The present invention relates generally to egress and ingress portals for small pets, especially cats. More specifically, the present invention relates to a window mounted system that will permit a cat to independently exit and enter a dwelling, apartment, mobile home, recreational vehicle or the like, that also provides internal partitions or curtains for minimizing heat loss and preventing odors from entering the dwelling.

2. Description of the Prior Art

The prior art includes a number of window mounted pet enclosures which provide access for a cat, for example, from the interior of the dwelling into the enclosure. Such enclosures provide the pet with an opportunity to experience the out of doors while remaining safely within the confines of the enclosure and the dwelling. These enclosures may have windows or may be ventilated to the outside, as shown in U.S. Pat. Nos. 5,337,697 and 5,167,202. Some may contain a litter box within the enclosure as shown in U.S. Pat. No. 5,842,438, or provide facilities for food and water, U.S. Pat. No. 5,133,291. In each instance, however, these enclosures are intended to prevent the pet from actually entering the outside world. If the pet owner desired to put the pet outside, such enclosures would be of no use and the pet owner would be required to open the door in the conventional manner. Other devices such as the "doggy door" permit access to the outside, but do not provide a suitable means to minimize heat loss or prevent odors from entering the dwelling. Moreover, a doggy door is a permanent installation.

Therefore, it is the object of the invention to provide a window mounted portal for a pet between the indoors and the out of doors. It is a further object of this invention to provided a system for minimizing heat loss and the entry of odors back into the house.

SUMMARY OF THE INVENTION

The invention comprises a box like structure which is mounted in a window having at least one opening to the interior of the dwelling and at least one opening to the out of doors. The structure, has a floor or bottom wall, a ceiling or top wall, and side and end walls between the top and bottom walls. The openings are typically located in the side walls of the structure facing indoors and outdoors, respectively. At least one floor to ceiling partial divider runs along the interior of the box, creating a U-shaped interior passageway through which the pet must travel to access the inside of the dwelling or the out of doors. Located in the passageway is at least two, and preferably several, flexible flaps or doors through which the pet travels to reach its destination. The flexible flaps or doors, which may be made of vinyl or rubber, for example, fit snugly to the sides of the passageway and between them form one or more airlocks to minimize the loss of heat from the dwelling and to also prevent outside odors from entering. Yet they are sufficiently flexible to enable the cat to easily push them aside while walking through the structure.

BRIEF DESCRIPTION OF THE DRAWINGS

Further features and advantages of the present invention will be apparent from the following detailed description of a preferred embodiment, taken in conjunction with the accompanying drawings wherein like numerals depict like parts, and wherein:

FIG. 1 is a perspective view of the present invention in a window mounted installation;

FIG. 2 is another perspective view of the present invention;

FIG. 3a is a partially exploded perspective view of the top wall of the structure showing the internal flaps;

FIG. 3b is a partially exploded perspective view of the bottom portion of the structure showing the interior passageway of the present invention;

DETAILED DESCRIPTION OF THE PREFERRED EMBODIMENT

Figure 4:
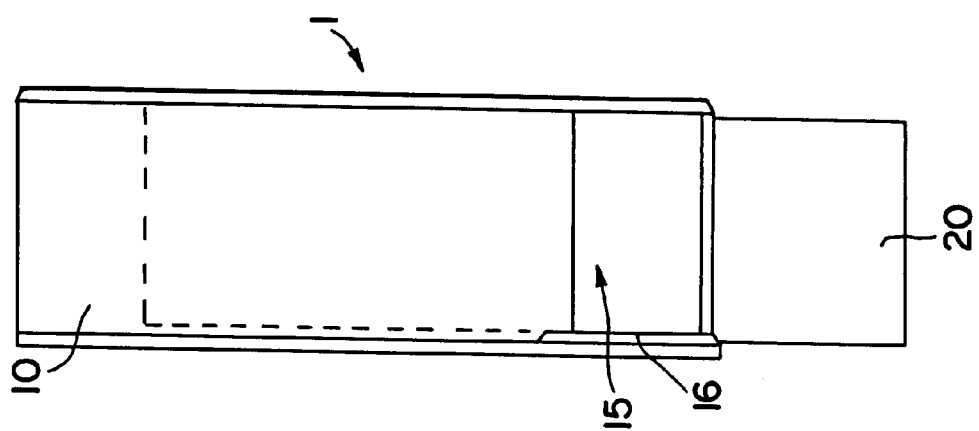
FIG. 4 is a diagrammatic side elevational view of the of the present invention.

Referring to FIGS. 1 and 2, the pet portal 1 according to the preferred embodiment consists of a generally box-like structure 1 that is preferably mounted in a window opening 2 of a house or like dwelling, i.e., a mobile home, apartment, recreational vehicle for example. As shown in FIG. 1, the pet portal extends from inside the dwelling to the out-of-doors allowing the pet to enter and exit the structure through openings 15 and platform 16. The pet portal 1 is mounted in window opening 2. Housing 10 rests on window sill 4, and is secured on the sides by the window frame 3, with top wall 11 of the structure secured at the top by window sash 6. Extension panel 20 contained in the structure is extended outward so as to engage window frame 3 and is further secured by window sill 4 and sash 6. Any remaining gap or space between extension panel 20 and window sash 6 at the top or window sill 4 at the bottom may be filled in by a strip of foam rubber 7, or other material capable of snugly inserted into the gap. Extension panel 20 may be extended toward or out from housing 10 to accommodate various size openings. The pet portal 1 may also include an accordion type, sliding frame extension panel 2 in a manner similar to the conventional window air conditioner.

As shown in FIG. 3a, top wall 11 has at least one internal flap or door 17 made of vinyl or flexible rubber or the like depending therefrom. Alternatively, flap 17 may comprise a plurality of elongate strips 17a. Preferably, but not necessarily flaps 17 or 17a as the case may be, are weighted at their bottoms 17b. In use, top wall 11 is amounted atop housing 10 and flaps 17 extend downward from the bottom surface of top wall 11 into the internal passageway 14 (as shown in FIGS. 3b and 4) of the pet portal 1, fitting snugly between interior dividers 21 and the inner surfaces of housing 10 to the sides and upper surface 18 housing 10. In this fashion, flaps 17 act as airlocks to minimize loss of heat from the inside of the house and to prevent the passage of odors from outside the house, while also being sufficiently flexible or movable to enable the pet to easily push them aside in the manner of a tent flap, while walking through the structure. Dividers 21 serve to create internal passageway 14 and also serve to secure extension panel 20 which is slidable therebetween accommodate different sized window openings. Extension panel may be locked in place by mechanical fixture 20a or the like.

Figure 5:
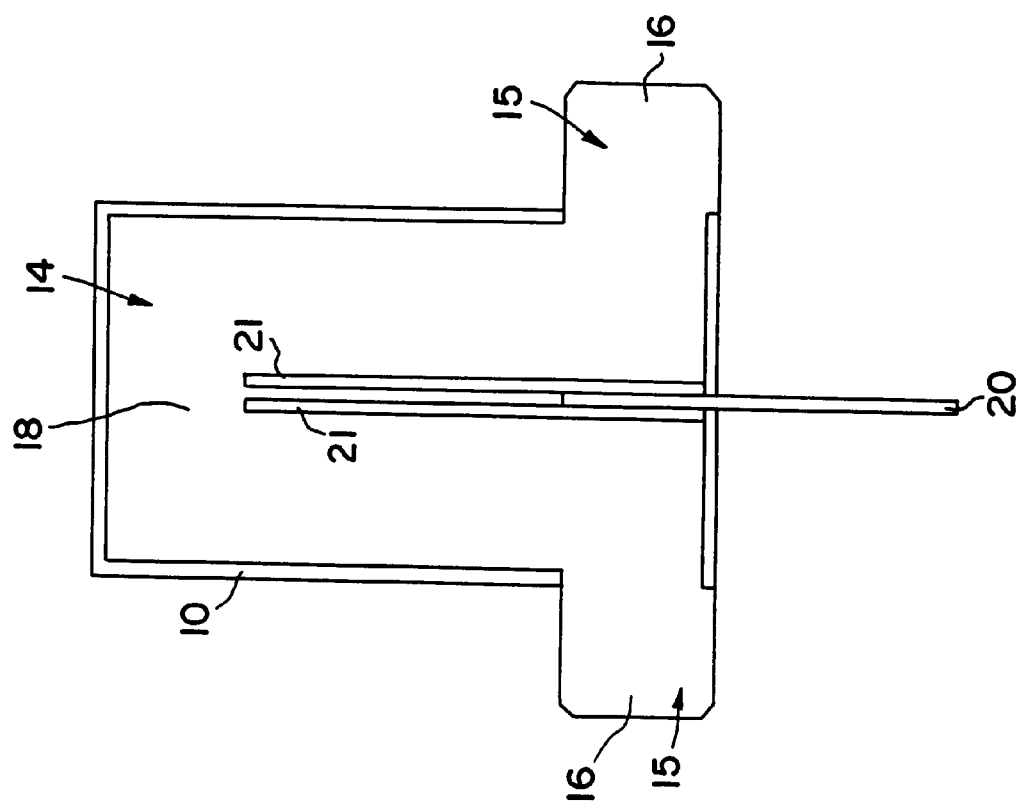
FIG. 5 is a plan view of the present invention showing the interior passageway.

As shown in FIG. 5, platform 16 provides entry and egress through openings 15. The pet travels through internal passageway 14 created by dividers 21 on surface 18. Although not shown, flaps 17 hang down into the passageway as described.

The present invention as described may be constructed of wood, plastic, or any other material suitable to serve as a structure for these purposes. The structure need not be limited to a box-like structure, and may be formed at least in part of a transparent material such as glass or plexiglass and/or contain one or more windows or transparent panels (shown in phantom at 30) built into the walls, e.g. walls 10 and 15 may contain a window enabling the pet to gaze to the outside while remaining within the confines of the structure.

While the present invention has been described in its preferred embodiment, it will be appreciated that many variations and embodiments are possible within the scope of the invention as described.

What is claimed is:

1. A window mountable pet portal having openings from the interior of a dwelling to the out-of doors, comprising a housing including top and bottom walls, and side and end walls defining an interior space, at least one internal divider mounted dividing said interior space into an interior passageway, said top wall having at least two flexible flaps extending downward therefrom into an interior passageway and fitting snugly in the passageway; said portal also having on at least one side an extendable panel adjustable to the window opening.

2. A pet portal according to claim 1, wherein the flaps are weighted adjacent their bottom ends.

3. A pet portal according to claim 1, wherein the flaps are formed of vinyl.

4. A pet portal according to claim 1, wherein the flaps are formed of rubber.

5. A pet portal according to claim 1, wherein the flaps comprise a plurality of side by side strips.

6. A pet portal according to claim 1, and including at least one transparent panel or window in a side or end wall thereof.

7. A pet portal according to claim 1, wherein at least one of said side or end walls is formed of a transparent material.

\* \* \* \* \*